United States Patent [19]
Bolt

[11] Patent Number: 4,811,347
[45] Date of Patent: Mar. 7, 1989

[54] APPARATUS AND METHOD FOR MONITORING MEMORY ACCESSES AND DETECTING MEMORY ERRORS

[75] Inventor: Durk J. Bolt, Beekbergen, Netherlands

[73] Assignee: U.S. Philips Corporation, New York, N.Y.

[21] Appl. No.: 8,672

[22] Filed: Jan. 29, 1987

[30] Foreign Application Priority Data

Jan. 30, 1986 [NL] Netherlands ............... 8600217

[51] Int. Cl.[4] ............................................. G06F 11/10
[52] U.S. Cl. ........................................................ 371/51
[58] Field of Search ............................ 371/51, 47, 19; 364/200, 900

[56] References Cited

U.S. PATENT DOCUMENTS

| | | | |
|---|---|---|---|
| 3,427,443 | 2/1969 | Apple et al. | 371/19 |
| 3,982,111 | 9/1976 | Lerner et al. | 371/51 X |
| 4,656,631 | 4/1987 | Nowak | 371/19 |
| 4,689,772 | 8/1987 | Jordy et al. | 371/51 X |

Primary Examiner—Charles E. Atkinson
Attorney, Agent, or Firm—Thomas A. Briody; Jack E. Haken; Anne E. Barschall

[57] ABSTRACT

A data processing arrangement which comprises a memory device provided with a memory with a first field in which memory words are stored or can be stored and a second field in which an error protection bit can be stored for every memory word from the first field. The memory device further comprises an error protection bit generator for the generation of error protection bits and a coincidence circuit. This coincidence circuit operates in two different modes, on the one hand, an error protection mode in which error protection operations, suh as for example the use of parity bits, take place in the known manner and, on the other hand, a coincidence mode in which the error protection operations are suppressed and replaced by coincidence operations. These coincidence operations make it possible to find out whether access operations are being performed at pre-determined memory addresses. In order to make these coincidnece operations possible, a coincidence bit is stored in the second field at these pre-determined memory addresses before the coincidence circuit is allowed to operate in the coincidence mode.

18 Claims, 2 Drawing Sheets

APPARATUS AND METHOD FOR MONITORING MEMORY ACCESSES AND DETECTING MEMORY ERRORS

BACKGROUND OF THE INVENTION

1. Field of the Invention

The invention relates to a data processing arrangement comprising a control unit and a memory device connected therewith. The memory unit contains a memory provided with a first and a second field, so that for each memory word in the first field at least one error protection bit can be stored at a corresponding address in the second field. The memory device contains an error protection bit generator connected to the first field for the generating, on the basis of a memory word presented, at least one error protection bit. The memory device is also provided with an error protection device for carrying out, together with the error protection bit generator and the second field, an error protection operation on a memory word presented. The control unit contains an error protection instruction generator for the generation of an error protection instruction. The error protection device contains a coincidence circuit, a first input of which is connected to an output of the error protection bit generator and a second input of which is connected to a data output of the second field. The error protection device is provided in order to deliver the result of an error protection operation to a result output under the control of an error protection instruction, received at a control input and on reading a memory word.

2. Background of the Invention

A data processing arrangement of this type is known from the German patent application No. 34 04 782. In the known data processing arrangement, the error protection bit generator is formed by a parity bit generator which generates a parity bit for each memory word presented. When writing the memory word in the first field, the known arrangement writes this parity bit in the second field at an address that corresponds to the address at which the relevant memory word is written in the first field. The recognition of parity errors when reading memory words operates further in the known manner. However, in order to use the known data processing arrangement to investigate for analytical purposes whether memory words are read at particular addresses in memory, the parity bit at these addresses in the second field is first deliberately set wrong.

If a read operation is carried out at one of these addresses a wrong parity bit is then delivered to the coincidence circuit, with the result that the error protection operation has a negative result. The control unit is then notified of that negative result and is thus informed of the fact that a read operation has taken place at that particular address. In this way, the control unit can take the necessary measures.

A disadvantage of the known arrangement, however, is that it is only in read operations that it is possible to investigate whether these addresses, at which the error protection bit has been set wrong, are addressed. The known arrangement cannot therefore be used, for example, to investigate whether data is being written at these addresses. In addition, since a wrong parity bit is used, the arrangement is completely dependent on the content of the memory location in the first field at which it is desired to investigate access operations.

SUMMARY OF THE INVENTION

The object of the invention is to realize a data processing arrangement in which it is possible to detect every access operation, i.e. both write and read operations, at pre-selected addresses of the memory for analytical purposes by making use of the second field and the coincidence circuit, and in which the detection is independent of the content of the first field at these selected addresses.

For this purpose, a data processing arrangement according to the invention is characterised in that the control unit contains a coincidence generator connected to the coincidence circuit for the consecutive generation of a coincidence signal. The coincidence signal contains at least one memory address and a coincidence instruction. The data processing arrangement is further characterized in that the memory device is provided with storage control facilities in order to store, under the control of a coincidence signal, a coincidence bit at the appropriate memory addresses in the second field and to store the inverse value of the coincidence bit at the other addresses in the second field. The coincidence circuit is further provided in order to block, under the control of a coincidence instruction received at the control input when the memory is being addressed, the error protection device and the output of the error protection generator. The coincidence circuit also reads the data stored at the addressed address in the second field and brings it in via the second output. In addition, the coincidence circuit recognizes a coincidence bit from the data received at the second input and presents it at the result output. At the designated memory addresses at which access operations are to be investigated, a coincidence bit is now stored in the second field by the storage control device and under the control of the coincidence signal. Therefore, it is possible, by detecting the presence of such a coincidence bit after the generation of the coincidence instruction, to investigate each access, for both read and write operations, to the addresses designated by the coincidence signal. The data processing arrangement according to the invention therefore offers the possibility of investigating every access to the designated addresses independently of the content of the first field at the said addresses. Since the error protection device and the output of the error protection bit generator are blocked, the result of an error protection operation is suppressed and in this way the recognition of a coincidence bit is not disturbed.

A preferred embodiment of a data processing arrangement according to the invention is characterised in that the result output of the coincidence circuit is connected to an input of a validation circuit. A first data input of the validation circuit is connected to the control unit for the reception of indicators which represent the actions of the control unit. A second data input of the validation circuit is for the reception of pre-determined conditions. The validation circuit is provided in order to validate a coincidence bit received when the indicators correspond to the conditions, and to deactivate a coincidence bit received when the indicators do not correspond to the conditions. This creates the possibility of subjecting a coincidence bit presented at the result output to conditions. These conditions can, for example, be that one only wishes to investigate the access to the designated memory locations when handling certain programs, or only in the case of certain modes, such as the supervisor or user mode of the control unit.

A first preferred embodiment of a data processing arrangement according to the invention is characterised in that the error protection means comprise a first gate circuit (22). The first gate circuit is switched to permit signals to pass through under the control of an error protection instruction received by the coincidence circuit and is switched to block signals under the control of a coincidence instruction received by the coincidence circuit.

A gate circuit provides an easy-to-implement solution for achieving the activation or deactivation of the error protection device.

A further preferred embodiment of the data processing arrangement according to the invention is characterised in that the error protection device contains a second gate circuit (35, 36). An input of this second gate circuit is connected to the first input of the coincidence circuit and a output of this second gate circuit is connected to a data input of the second field. The second gate circuit is switched to permit signals to pass through under the control of an error protection instruction received by the coincidence circuit and is switched to block signals under the control of a coincidence instruction received by the coincidence circuit. Since this second gate circuit is connected to the first input of the coincidence circuit, to which first input the output of the error protection generator is connected, an error protection bit which has been generated is presented at the gate input of this second gate circuit. Under the control of an error protection instruction, the gate circuit permits signals to pass through and in this way the error protection bit is transported to the data input of the second field where it is stored. Under the control of a coincidence instruction the gate circuit is blocked so that the error protection bit presented cannot disturb the content of the second field.

Another preferred embodiment of a data processing arrangement according to the invention is characterised in that the coincidence circuit contains a third input for the reception of a write or read signal generated by the control unit. The coincidence circuit contains a third gate circuit (21, 40) of which a gate input is connected to the above-mentioned third input. The third gate circuit is provided in order to deliver, under the control of an error protection instruction received by the coincidence circuit, a write or read signal received to its gate output and, under the control of a coincidence instruction received by the coincidence circuit, to deliver a write or read signal received as a read signal to its gate output. In this way, the third gate circuit ensures that when a coincidence instruction is presented at the control input of the coincidence circuit, a write signal is not presented at the second field so that its content is not affected. In addition, by converting a write signal into a read signal, it is ensured that also when writing in the first field the content is read at the corresponding address in the second field and in this way any coincidence bit which may be present there is presented at the coincidence circuit.

It is advantageous that the coincidence circuit contain a fourth and a fifth input, respectively, for the reception of a coincidence bit and a coincidence write command, respectively, generated by the control unit, which fifth input is connected to a further gate input of the third gate circuit (40) and to a first gate input of a fourth gate circuit (37). The fourth gate circuit includes a second gate input for the reception of the coincidence bit and a gate output connected to a further gate input of the second gate circuit. The fourth gate circuit (37) is provided in order to deliver a coincidence bit presented to its gate output under the control of a coincidence write command which is presented. As a result, it is possible to write coincidence bits in the second field without affecting the content of the first field.

Yet another preferred embodiment of data processing arrangement according to the invention is characterised in that the coincidence circuit contains a fifth gate circuit (24). An input of the fifth gate circuit is connected to the second input of the coincidence circuit. The fifth gate circuit is switched to permit signals to pass through udner the control of a coincidence instruction received by the coincidence circuit and is switched to block signals under the control of an error protection instruction received by the coincidence circuit. As a result, it is easy to ensure that a coincidence bit which has been recognised is delivered at the result output of the coincidence circuit.

It is advantageous that the error protection bit generator is a parity bit generator. This results in a simple embodiment, because nearly every memory device contains a parity bit generator of this kind.

The invention also relates to a method for writing at least one coincidence bit into a memory device which forms part of a data processing arrangement according to the invention and in which the memory is suitable both for reading and for writing information.

A method according to the invention is characterised in that includes the following steps:

(a) the generation by the control unit of a coincidence signal with at least one related memory address;

(b) the calling up of a memory word stored at a first memory address designated by the coincidence signal and the storage of that memory word in a register;

(c) the writing in the first field of a pre-determined memory word at the first memory address designated by the coincidence signal, which pre-determined memory word generates an error protection bit, the value of which is equal to that of the coincidence bit;

(d) the presentation of the pre-determined memory word to the error protection bit generator and the writing in the second field of the generated error protection bit at the first memory address designated by the coincidence signal;

(e) the generation by the control unit of a coincidence instruction and the presentation of the coincidence instruction at the control input of the coincidence circuit;

(f) the calling up of the memory word from the register and the writing in the first field of that memory word at the first memory address designated by the coincidence signal;

(g) in the event of the coincidence signal containing more than one memory address, the generation by the control unit of an error protection instruction, the presentation of the error protection instruction at the control input of the coincidence circuit and the repetition of the steps b to f inclusive for each of these other memory addresses;

(h) the writing of a data bit which has the inverse value of the coincidence bit at all the remaining memory addresses of the second field which have not been designated by the coincidence signal.

Since the memory words stored at a memory address designated by the coincidence signal are stored in a register and after the coincidence bit has been loaded into the second field are again written at the original address, the content of the first field is not affected by the writing of a coincidence bit. In addition, by making use of a pre-determined memory word which generates an error protection bit with the same value as the coincidence bit, it is possible to use the error protection bit generator as a generator of coincidence bits and no extra hardware elements are therefore required for this purpose.

An alternative form of a method according to the invention includes the following steps:

(a) the generation by the control unit of a coincidence signal with at least one related memory address;

(b) the presentation of a pre-determined memory word to the error protection bit generator, which pre-determined memory word generates an error protection bit, the value of which is equal to that of the coincidence bit;

(c) the writing in the second field of the generated error protection bit at the memory addresses designated by the coincidence signal;

(d) the writing of a data bit which has the inverse value of the coincidence bit at all the remaining memory addresses of the second field which have not been designated by the coincidence signal.

When a memory from which only information can be read is used for the first field, it is then unnecessary to keep the original memory words temporarily in a register.

BRIEF DESCRIPTION OF THE DRAWING

The invention will now be further explained on the basis of the drawing in which.

DETAILED DESCRIPTION OF THE PREFERRED EMBODIMENT

Figure 1:
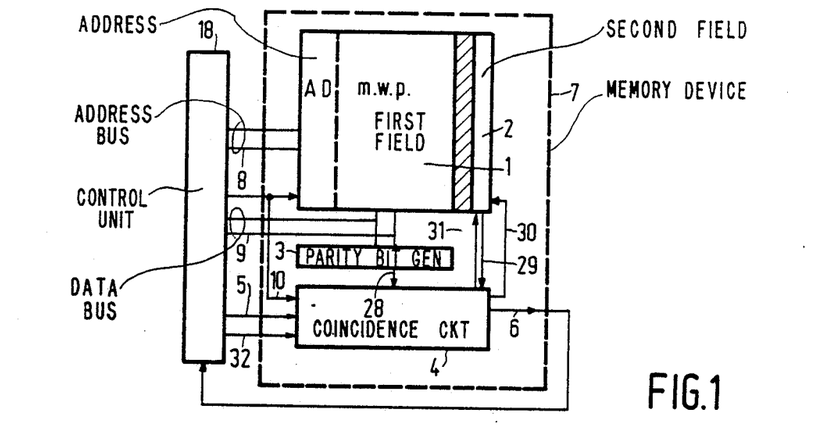
FIG. 1 shows a first embodiment of a data processing arrangement according to the invention.

FIG. 1 shows a first example of an embodiment of a data processing arrangement according to the invention. The data processing arrangement comprises a memory device 7 equipped with a memory with a first field 1, for example a semiconductor memory (ROM, RAM, etc.) in which memory words can be stored or are stored. These memory words contain, for example, an 8 bits data word or an 8 bits instruction word. The memory also contains a second field 2 for the storage of error protection bits, for example parity bits. When the first field, for example, has a capacity of 256×8 bits, then the second field has a capacity of, for example, 256×1 bits, in such a way that for each memory word from the first field one appertaining parity bit can be stored. The first field 1 is connected by means of a data bus 9 and an address bus 8 to a control unit 18, for example, a microprocessor. The data bus is also connected to an error protection bit generator, in this example a parity bit generator 3, an output of which is connected via a line 28 to a first input of the coincidence circuit 4. A second input of the coincidence circuit 4 is connected to a data output of the second field via a line 29. A control input and a third and fourth input of the coincidence circuit, respectively, are connected via the lines 5, 10 and 32, respectively, to the control unit. A read/write signal (R/W) is presented at line 10. A coincidence instruction or an error protection instruction is presented at line 5, and a clockwise pulse is presented at line 32. A first output and a second output of the coincidence circuit, respectively, are connected to a data input and a read/write control input of the second field via line 31 and 30, respectively. A result output of the coincidence circuit is connected to the control unit via a line 6.

Figure 2:
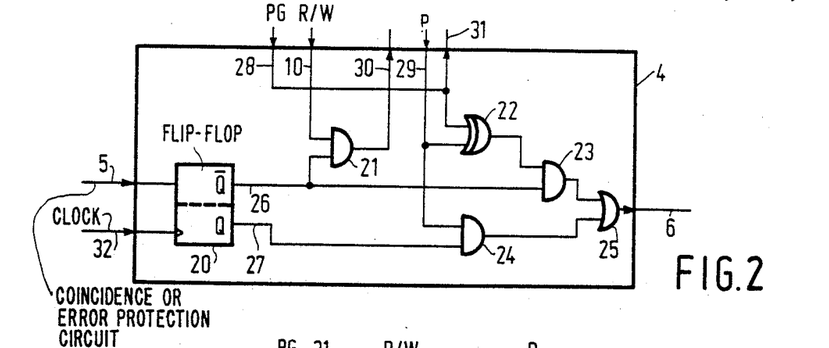
FIG. 2 shows a first preferred embodiment of a coincidence circuit.

FIG. 2 shows a first example of an embodiment of the coincidence circuit 4 from the memory device 7. The coincidence circuit contains a flip-flop 20, an input of which is connected to line 5. The output $\overline{Q}$ of the flip-flop is connected via line 26 to a first gate input of the logic AND gate 21 and 23. The output Q of the flip-flop is connected via line 27 to the first gate input of logic AND gate 24. A read/write signal received at the third input via line 10 is presented to a second gate input of the logic AND gate 21. An output of this logic AND gate 21 is connected to the second output of the coincidence circuit via line 30. An output of the parity bit generator 3 is connected via line 28 to a line 31 which is connected to the first output of the coincidence circuit and to a first gate input of an Exclusive-OR gate 22. A data output of the second field is connected via line 29 to the second gate input of the logic AND gate 24 and the Exclusive-OR gate 22, respectively. The gate output of the Exclusive-OR gate 22 is connected to a second gate input of the logic AND gate 23, a gate output of which is connected to a gate input of the logic OR gate 25 which has a further gate input connected to the output of the logic AND gate 24. A gate output of the logic OR gate 25 is connected to line 6.

Two situations can now be distinguished for the operation of the memory device 7. These two situations will be designated as the parity mode (or error analysis mode) and the coincidence mode, respectively.

(A) Parity Mode

In this mode the memory device operates in a manner which is known for every memory device equipped with a parity field 2 and a parity bit generator 3 in order to carry out an error analysis operation on the basis of parity. In this parity mode an error protection instruction, for example, a parity instruction in the form of a low-level pulse (logic 0) is presented at the control input of the coincidence circuit 4 via the line 5. This error protection instruction is generated by the control unit. The said low-level instruction switches the flip-flop in such a way that a "0" is delivered at the output Q of the flip-flop and a "1" at output $\overline{Q}$. This switching of the flip-flop takes place under the control of a clock pulse delivered by the control unit via line 32.

When a memory word mWP presented via the data bus 9 is to be written at an address AD, presented via the address bus 8, then the memory word is presented to the parity bit generator 3 nearly simultaneously to this write operation. On the basis of the memory word mWP received, an error protection operation is now started in which the parity bit generator 3 generates a parity bit. The generated parity bit is presented at the data input of the second field via the lines 28 and 31. Because $\overline{Q}=1$ and W=1 (write operation) and logic AND gate 21 permits signals to pass through and the write command (W=1) is presented at the write control input of the second field via line 30. As a result, the parity bit generated is stored in the second field at memory address AD.

When reading the memory word mWP at address AD the word which is read is presented to the parity bit generator 3, which generates a parity bit on the basis of this. The bit generated by the parity bit generator 3 is presented at the Exlusive-OR gate 22 via line 28. The parity bit coming from the second field is also presented at the Exclusive-OR gate 22 via line 29. Since this involves a read operation R=0 and the signal at the output of the logic AND gate 21 is equal to logic zero. It is therefore impossible to write in the second field and in this way the parity bit present on line 31 is not written in the second field.

When the parity bits on the lines 28 and 29 are equal in this error protection operation (corresponding parity, both equal to 0 or both equal to 1) then a logic "0" is delivered at the output of the Exclusive-OR gate 22. This logic "0" is presented at the gate input of the logic OR gate 25 via the logic AND gate 23. Since Q=0 a logic "0" is delivered at the output of the logic AND gate 24. A logic "0" is therefore presented at both gate inputs of the logic OR gate 25 and in this way a low-level signal is delivered on line 6 which indicates that the parity is in agreement.

When the parity bits on lines 28 and 29 are unequal (wrong parity) the logic "1" is delivered at the output of the Exclusive-OR gate 22 which, combined with $\overline{Q}=1$ forms a logic "1" at the output of logic AND gate 23. This logic "1" is then presented to the line 6 via logic OR gate 25. This logic "1" on line 6 indicates that there is a wrong parity at the address AD.

(B) Coincidence mode

In this mode it is possible to investigate the activity at one or more memory addresses. Placing a coincidence bit at one or more memory addresses enables the user or the control unit itself to investigate what operations (reading, writing) are taking place at the addresses designated by a coincidence bit and when these take place.

Switching over to the coincidence mode requires some prior operations which will now be described. Let us assume that the operations which take place at address AD are to be investigated and that the first field of the memory is suitable both for reading and for writing data, hence, for example, a RAM. For the application of the invention the second field must always be a read and write memory since it must be possible both to write in and read out a coincidence bit.

When the coincidence circuit 4 according to FIG. 2 is used, a coincidence signal is first generated by the control unit before switching over to the coincidence mode, as a result of which a program is started. The program ensures, among other things, that a read operation is performed at the address AD, given by the coincidence signal. During this read operation the coincidence circuit is switched in the parity mode. The object of this read operation is to protect the memory word present in the first field at address AD, as will be made clear later on. After being read, the memory word present at address AD is temporarily stored, for example, in a register of the control unit. Next, a memory word is written at address AD, the parity bit of which has the same value as the coincidence bit, for example, logic "1". The relevant memory word is presented at the first field and the parity bit generator 3 via the data bus 9. On the basis of this, the parity bit generator then generates a parity bit, in this example a logic "1", which is presented via lines 28 and 31 at the data input of the second field. Since the coincidence circuit is switched in the parity mode, the write control input is activated via line 30, as a result of which the logic "1" generated is therefore written into the second field at address AD as a coincidence bit.

Next, a coincidence instruction is presented at the control input of the coincidence circuit 4 via line 5, for example, by means of a high-level pulse (logic 1). The coincidence instruction is generated, for example, by the control unit itself or by the user. With the occurrence of an almost simultaneous clock pulse on line 32, the pulse of the coincidence instruction switches the flip-flop in such a way that now Q=1 and $\overline{Q}=0$. The coincidence circuit is thus switched into the coincidence mode.

Next, the memory word stored in the register of the control unit is called up in order to write it at address AD in the first field again. As a result, the original content of the address AD has been preserved. Since the coincidence circuit has now been switched into the coincidence mode, however, when writing in the first field, writing no longer takes place in the second field, as will be explained below.

Since in the coincidence mode $\overline{Q}=0$, the logic AND gate 23 is blocked, so that the investigation of the parity bits in the second field, as described in the parity mode, is deactivated. In addition, because $\overline{Q}=0$ the logic AND gate 21, one gate input of which is connected to the output $\overline{Q}$ of the flip flip, is blocked. The other input of the logic AND gate 21 is connected to line 10 on which the write/read (W/R) signal is presented. This means that when a write signal (W=1) is generated by the data processing system and the coincidence circuit is in the coincidence mode, the blocked logic AND gate 21 ensures that the write signal is not presented at the write control input of the second field. The point is that the gate output of logic AND gate 21 is connected to line 30, which is connected to the write/read control input of the second field. On the other hand, however, a read signal at the read control input of the second field is seen as a read signal R=0. In the case of a write instruction, the blocking of the writing in the second field in the coincidence mode is used in order not to modify the content of the second field, but to enable it to be read. The point is that since $\overline{Q}=0$ a logic "0" is delivered at the gate output of the logic AND gate 21, which is seen at the read control input of the second field as an R=0 or read instruction.

When the first field contains a memory that is only suitable for read operations, for example, a ROM, then the method for loading a coincidence bit at address AD is simpler, for since it is not possible to write into such a memory, the operations for protecting the memory word are unnecessary. It therefore suffices to present a memory word at address AD, the parity bit of which has the same value as the coincidence bit. In this embodiment the first field is protected against write operations and in this way that memory word is not written at address AD. The parity bit generator 3 does, however, generate a parity bit which is stored in the second field as a coincidence bit at address AD. After this operation the coincidence instruction is presented at the coincidence circuit as described above.

It will be clear that when a coincidence is required at several memory addresses, the above-mentioned procedure for setting a coincidence bit should be repeated. At the remaining memory locations in the second field where no coincidence is required, a bit is stored which has the inverse value of the coincidence bit, i.e. in this example of an embodiment a logic "0". This logic "0" can be written, on the one hand, by means of an analog procedure as described for the writing of the coincidence bit, i.e. by writing another memory word that has logic "0" as parity bit or, on the other hand, by carrying out a so-called "flush operation" on the second field prior to writing the coincidence bit(s). In a flush operation such as this a logic "0" is written in the second field at all addresses.

Let us now assume that in the coincidence mode a memory word is written at address AD. The signal (R=0) at the gate output of the logic AND gate 21 ensures that the information stored at address AD in the second field is read and is presented at the one gate input of the logic AND gate 24 via line 29. Since the coincidence bit ("1") was stored at address AD in the second field, this is presented at the logic AND gate 24 where it is combined with the signal Q=1. Since Q=1, the coincidence bit is passed on and delivered via logic OR gate 25 to line 6. The coincidence bit delivered on line 6 is now presented to the control unit which is thus informed of the fact that a write operation has happened at address AD, where the coincidence bit was placed.

A similar operation takes place when a read operation is carried out at the address AD. Then, too, the coincidence bit is presented at the logic AND gate 24 via line 29.

If an address different from AD is now addressed in which no coincidence bit is stored in the second field, but a logic "0", then this logic "0" is presented at the logic AND gate 24 via line 29 and in this way delivered via logic OR gate 25 on line 6.

Depending on the control unit connected to the memory device, the presentation of a coincidence bit on line 6 results in the generation of an interrupt or a bus error which causes an exception routine to start in the control unit.

The data processing arrangement in FIG. 1 therefore offers the possibility to monitor accesses (both read and write) to pre-determined memory locations without previously interfering with the content at these locations in the first field and without making use of an extra memory field to be added for this purpose.

For the sake of completeness a side effect connected with the writing of coincidence bits in the second field should also be mentioned. This side effect occurs when the memory word, which is stored in the register of the data processing unit, is again written in the first field. Since in this writing the coincidence circuit is already switched in the coincidence mode, a write signal (W=1) for the second field is converted into a read signal (R=0). This read signal now ensures that the coincidence bit just stored is read and presented at a gate input of the logic AND gate 24 where it is combined with Q=1 and therefore delivers a coincidence bit to line 6. In order to prevent the control unit from converting the coincidence bit into, for example, an exception routine, it is possible to program the control unit in such a way that when it has generated a coincidence instruction it disregards the first following coincidence bit. The point is that the writing of the memory word which has been stored is the first instruction that the control unit executes after the generation of the coincidence instruction. In that same program, which controls the storage of the memory word and the generation of the coincidence instruction and the coincidence signal, it is therefore easy to incorporate an instruction which disregards the first coincidence bit on line 6.

Figures 3, 5:
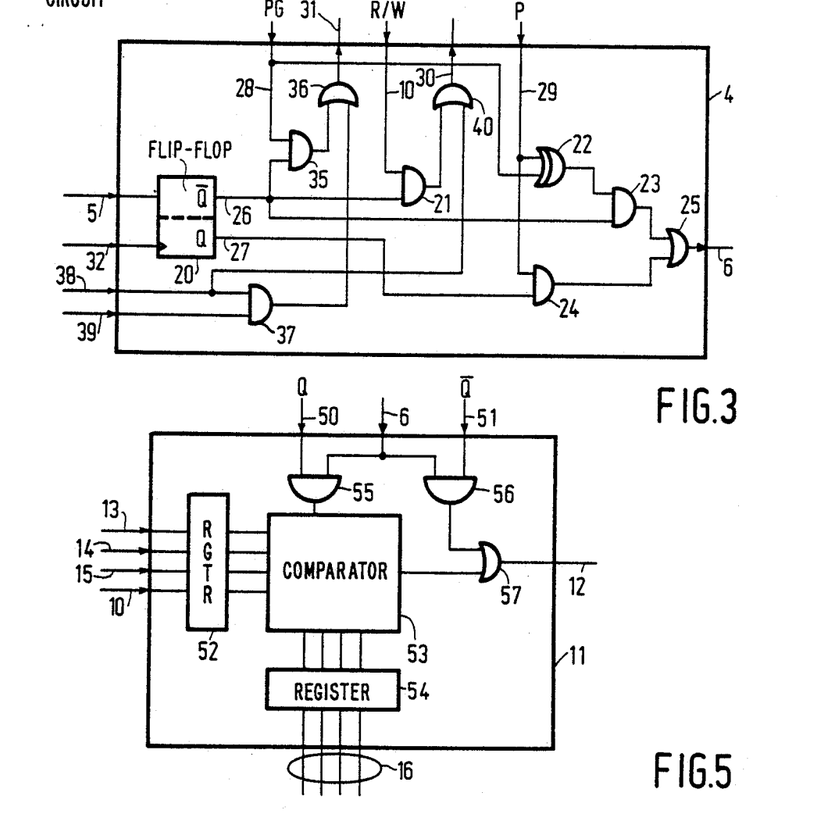
FIG. 3 shows a second preferred embodiment of a coincidence circuit.
FIG. 5 shows an example of an embodiment of a validation circuit to be used in a memory device according to the invention.

FIG. 3 shows a second embodiment of a coincidence circuit which can be used in a memory device according to the invention. In this embodiment elements corresponding to those in FIG. 2 have the same reference number. The set up of the logic gates 21, 22, 23, 24 and 25 is completely analogous to those described in FIG. 2. Since this part of the coincidence circuit otherwise operates completely analogously to that described in FIG. 2 this will not be dealt with further here.

The coincidence circuit shown in FIG. 3 also contains a logic AND gate 35, a first gate input of which is connected via line 28 to an output of the parity bit generator 3 and a second gate input is connected via line 26 to the output $\overline{Q}$ of the flip-flop 20. A gate output of the logic AND gate 35 is connected to a first gate input of a logic OR gate 36, the gate output of which is connected via line 31 to the data input of the second field. A second gate input of the logic OR gate 36 is conected to a gate output of a logic AND gate 37. A first and second gate input, respectively, of the logic AND gate 37 are connected with a line 38 and a line 39, respectively. A coincidence write command AND a coincidence bit generated by the control unit, respectively, are presented on the lines 38 and 39, respectively, which are connected to the control unit. The coincidence write command is further presented via line 38 to a second gate input of a logic OR gate 40, a first gate input of which is connectd to a gate output of the logic AND gate 21. A gate output of the logic OR gate 40 is connected via line 30 to the read/write control input of the second field.

A distinction will also be made between the parity mode and the coincidence mode for the description of the operation of the coincidence circuit in FIG. 3.

As described in FIG. 2, in the parity mode $\overline{Q}=1$ and Q=0 at the output of the flip-flop. When data are now written at an address, for example AD, in the first field of the memory, then the write signal W=1 is presented via line 10 at the first gate input of the logic AND gate 21 where it is combined with the signal $\overline{Q}=1$ and in this way is presented via the logic OR gate 40 and line 30 at the read/write control input of the second field. The parity bit generated by the parity bit generator 3 is presented at the first gate input of the logic AND gate 35 via line 28. Since $\overline{Q}=1$ the parity bit is presented via the logic OR gate 36 and line 31 at the data input of the second field where, under control of the write signal W=1 presented at the read/write control input, it is stored at address AD.

In a read operation in the parity mode a read signal R=0 is presented via logic AND gate 21 and logic OR gate 40 at the read/write control input of the second field. As a result the parity bit is read and presented via line 29 at the Exclusive-OR gate 22 at which the parity bit generated is also presented. The coincidence circuit shown in FIG. 3 operates further in an analogous manner in the parity mode to that shown in FIG. 2.

In the coincidence mode Q=1 and $\overline{Q}=0$, as a result of which the logic AND gate 35 and 21, each of which receives the signal $\overline{Q}=0$ via line 26, are blocked. The blocking of the logic AND gate 35 results in the output of the parity generator being blocked in the coincidence mode. The blocking of the logic AND gate 21 results in a write signal W=1 or a read signal R=0 always being presented as a logic "0", hence an R=0 signal, at the first gate input of the logic OR gate 40. As a result, in the coincidence mode the second field always receives a read signal at its read/write control input when the data processng unit delivers a write or read signal to line 10.

Prior to the switching of the switching circuit 4 in the coincidence mode a coincidence write command or a coincidence bit, respectively, is presented on the lines 38 and 39, for example, both a logic "1". Since both signals carry a logic "1" at the gate inputs of the logic AND gate 37, the gate permits signals to pass through and in this way the coincidence bit is presented via the logic OR gate 36 at the data input of the second field. Since line 38 is connected to a gate input of the logic OR gate 40, the coincidence write command at the read/write control input is presented as a write signal (W=1) at the second field. The coincidence write command is accompanied by one or more addresss which are presented via the address bus at the second field. A coincidence bit is now written at these addresses which are presented under the control of the coincidence write command. With a coincidence circuit according to FIG. 3 it is therefore possible to write coincidence bits in the second field without having to interfere with or temporarily store the contents of the first field. The writing of logic zeros at those addresses where no coincidence bits are written takes place by presenting a logic "0" via line 39. When these operations have been completed, the coincidence circuit is switched to the coincidence mode.

The detection of a coincidence bit at an access to the memory in the coincidence mode takes place further analogously to the manner described on the basis of FIG. 2.

It will be clear that the coincidence circuit to be used in a memory device according to the invention can also be constructed in another way than that shown in the examples of embodiment given in FIGS. 2 and 3. For example, instead of using a flip-flop, it is possible to cause the signals Q and $\overline{Q}$ to be delivered directly by the control unit.

Other embodiments of a memory device according to the invention are also possible, for example, by making use of Hamming code bits instead of using the parity bits as error protection bits. The application of the invention, however, requires the use of an already existing error protection mechanism. When the memory field contains more than one error protection bit per memory word it is then sufficient to use only one of these for the application of the invention.

Figure 4:
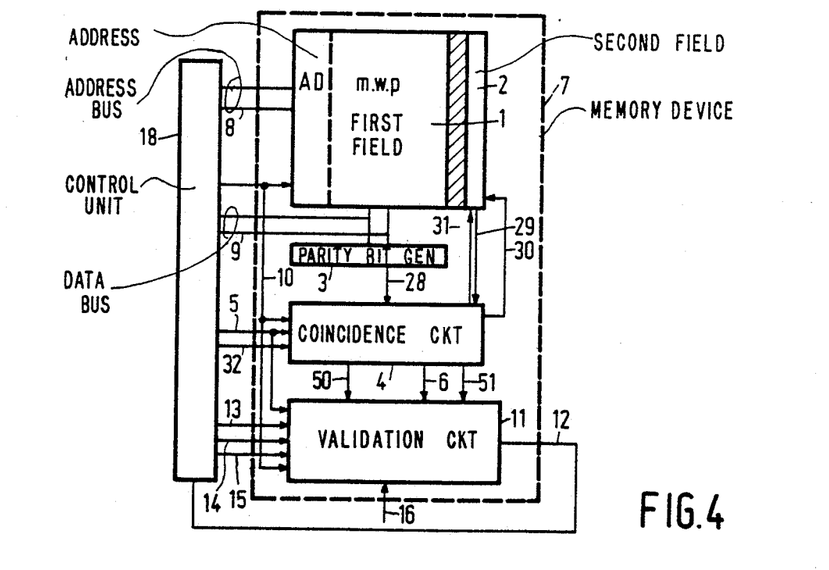
FIG. 4 shows a second embodiment of a data processing arrangement according to the invention.

FIG. 4 shows a further embodiment of a data processing arrangement according to the invention. In this embodiment elements corresponding to those in FIG. 1 have the same reference number. The line 6 at the output of the coincidence circuit is now connected to a validation circuit 11. This validation circuit has inputs—in this example there are 8 inputs—each of which is connected to a respective line. For example, lines 13, 14, 15 and 10 are connected to the control unit and are suitable for the reception of a Supervisor indicator (S), a program instruction/data indicator (P/D), the current program number (CPN) and the read/write signal (R/W), respectively. Specifications generated by the user which indicate under what conditions the user wishes to validate the coincidence bit are presented via input 16. The point is that it is possible that the user only wishes to validate the coincidence bit under certain conditions, for example, only in the case of a write operation at a particular memory address or only when executing a particular program number. All these conditions are presented via input 11, at the validation circuit 16. It will be clear that for these conditions presented via input 16 corresponding indicators will have to be presented via the lines 13, 14, 15 and 10 if they are actually to be taken into account. Examples of conditions are, therefore Supervisor mode or user mode or both, program instructions or data or both, one or more program numbers, or regardless of the program number, read or write instructions or both. It will be clear that this summary is only given as an example and that still other conditions and corresponding indicators are naturally possible.

FIG. 5 shows an example of an embodiment of a validation circuit to be used in a memory device according to the invention. The validation circuit contains a first register 52 and second register 54, respectively, the outputs of which are connected to a first input and second input, respectively, of a comparator 53. A control input of the comparator 53 is connected to a gate output of a logic AND gate 55, a first and second gate input, respectively, of which are connected to line 6 or via line 50, respectively, to the output Q of the flip-flop 20 in the coincidence circuit. A result output of the comparator 53 is connected to a first gate input of a logic OR gate 57. A second gate input of the logic O gate 57 is connected to a gate output of a logic AND gate 56, of which a first and second gate input, respectively, are connected to line 6 or via line 51, respectively, to the output $\overline{Q}$ of the flip-flop 20 in the coincidence circuit. The registers 52 and 54, respectively, are used for the temporary storage of the indicators presented via the lines 10, 13, 14 and 15 and/or the conditions presented via the input 16.

If the memory device is now in the parity mode then $\overline{Q}=1$ and a parity signal presented via line 6 is delivered directly to line 12 via the logic AND gate 36 and the logic OR gate 57 and is presented to the control unit 18 which is connected to line 12. In the parity mode Q=0 and in this way a logic "0" is presented at the control input of the comparator 53 so that the latter is inactive.

If the memory device is now in the coincidence mode, then $\overline{Q}=0$ and the logic AND gate 56 is blocked. Since Q=1 the coincidence mode a signal present on line 6 is presented at the control input of the compartor 53. If a signal with a value of logic "0" is now present on line 6 (not a coincidence) then the comparator is not activated by this and at the result output a logic "0" is delivered which is presented to the control unit via the logic OR gate 57 and line 12. On the other hand, if a logic "1" (i.e. a coincidence bit) is present on line 6 the comparator 53 is activated. Under the control of the coincidence bit received the comparator will now compare the indicators stored in the first register 52 with the conditions stored in the second register 54. If the respective indicators correspond to the respective conditions, then a logic "1" is delivered at the result output of the compartor. If it is not, the a logic "0" is delivered at the result output. This logic "0" therefore deactivates the coincidence bit and it therefore appears to the control unit that there has been no coincidence. Assume, for example, that the user only wishes to find out whether data are being written at address AD during the operation of the program with number xx and when the control unit is in the user mode. For this purpose, a coincidence instruction is generated with address AD and under the control of this the coincidence circuit 4 is switched to the coincidence mode and a coincidence bit is stored in address AD in the second field. In addition, the program number xx, the signal S=0 (user mode) and W=1 are loaded into the second register via line 16. Now, as long as the signal S=0 via line 13, and the number xx via line 15 and W=1 via line 10 are not presented in grouped form to the first register by the control unit, the coincidence signal delivered via line 16 is deactivated at every access to memory location AD. It is only when S=0 via line 13, xx via line 15 and W=1 via line 10 (line 14 is irrelevant since no conditions are set for this in this example), are presented together and memory location AD is addressed that the coincidence bit is delivered at line 12. The use of the line 14 therefore gives the user a range of extra possibilities for either validating the coincidence or not.

The validation circuit 11 can also be used to disregard the coincidence bit when rewriting in the first field the memory word that was stored temporarily in a register of the data processing unit. This can be achieved, for example, by presenting a program number via line 16 that is not the program number of the program that ensures the loading of the coincidence bit. This can be done both by the user and by the data processing unit itself.

What is claimed is:

1. A data processing arrangement comprising
   a. a first control unit having
      i. a first output for outputting a memory address,
      ii. a second output for outputting a coincidence control signal, and
      iii. a detection signal input;
   b. a memory having
      i. a first input fed by said first output for receiving said memory address,
      ii. a data region for storing data words, the data region having a data output for outputting addressed data words, and
      iii. a read-write parity region for storing in association with each data word a first parity bit co-addressable with its associated data word, said parity region having a bidirectional parity bit connection for outputting the first parity bit co-addressed with the associated data words;
   c. a parity bit generator fed by said data output for generating a second parity bit from any received data word;
   d. a coincidence control unit, coupled with said parity bit generator, having
      i. a comparator for comparing said seocnd parity bit with the associated first parity bit received from said bidirectional parity bit connection,
      ii. a comparison output,
      iii. a control signal output connected to said detection signal input, and
      iv. a control input coupled with said second output to receive said coincidence control signal;
   the coincidence control unit assuming under control of said coincidence control signal at least first, second, third and fourth states, and
      v. in said first state writing said second parity bit via said bidirectional parity bit connection into said parity region, so that said second parity bit thereafter operates as a first parity bit,
      vi. in said second state reading said first parity bit and connecting said comparision output to said control signal output for signalling any parity error,
      vii. in said third state writing a coincidence control bit with a first value in said parity region on any selected address, said first value differing from a second value prevailing at any address not selected, and
      viii. in said fourth state interconnecting said bidirectional parity bit connection to said control signal output for signalling, using said first value, address of any said selected address.

2. A data processing arrangement as claimed in claim 1, wherein
   a. said data region is a read-write data region and has a data input for receiving a data word, and
   b. said parity bit generator is coupled to said data input, so that, when said coincidence control unit is in said first state, said parity bit generator generates said second parity bit from the data word received on said data input, and the data processing arrangement further comprises:
   c. means for maintaining contents of said data region at said selected address, when said coincidence control unit is in said third state.

3. A data processing arrangement as claimed in claim 1 or 2 wherein:
   a. said control unit further comprises an invalidating signal output; and
   b. said coincidence control unit further comprises validation means having a validation input, fed by said invalidating signal output, for deactivating said control signal output under control of said invalidating signal, when said coincidence control unit is in said fourth state.

4. A data processing arrangement as claimed in claim 2, wherein
   a. said control unit further comprises a read/write signal output for forwarding a read/write signal to said memory and also for forwarding said read/write signal to said coincidence control unit;
   b. said coincidence control unit is responsive to
      i. said read/write signal, so that when said read/write signal has a first value said coincidence control unit assumes one of said first and third states and when said read/write signal has a second value said coincidence control unit assumes one of said second and fourth states, and
      ii. said coincidence control signal, so that when said coincidence control signal assumes a first value said coincidence control unit assumes one of said first and second states and when said coincidence control signal assumes a second value said coincidence control unit assumes one of said third and fourth states,
   whereby the state of said coincidence control unit is determined.

5. A data processing arrangement as claimed in claim 2 or 4, wherein memory has said data output and data input embodied in a bidirectional data path.

6. Data processing arrangement comprising:
   (a) a control unit for generating
      i. an error protection instruction, and
      ii. a coincidence signal, which includes at least one memory address and a coincidence instruction;
   (b) a memory device connected with the control unit, including:
      (i) a memory including:
         (A) a first field for storing data words, and
         (B) a second field such that for each memory word in the first field at least one error protection bit can be stored at a corresponding address in the second field;

(ii) an error protection bit generator, connected to the first field, for generating at least one error protection bit from a memory word;

(iii) error protection means for carrying out, together with the error protection bit generator and the second field, an error protection operation on a memory word, which error protection means includes:

(A) a coincidence circuit having:
(I) a first input connected to an output of the error protection bit generator,
(II) a second input connected to a data output of the second field,
(III) a control input for receiving one of the error protection instruction and the coincidence instruction, and
(IV) a result output for supplying a result of the error protection operation, under the control of the error protection instruction, during reading a memory word, the coincidence circuit, under control of the coincidence instruction when the memory is being addressed: blocking the error protection means and an output of the error protection bit generator; reading data from an appropriate address in the second field; recognizing a received coincidence bit from data received at the second input; and providing the received coincidence bit at the result output; and (iv) storage control facilities for storing, under the control of the coincidence signal, a coincidence bit at the at least one memory address in the second field.

7. Data processing arrangement according to claim 6, further comprising:

a validation circuit having:
(a) an input connected to the result output of the coincidence circuit;
(b) a first data input connected to the control unit for receiving indicators which represent actions of the control unit, and
(c) a second data input for receiving predetermined condition signals, the validation circuit validating the coincidence bit, if the coincidence bit is received when the indicators correspond to the condition signals and deactivating the coincidence bit, if the coincidence bit is received when the indicators do not correspond to the condition signals.

8. Data processing arrangement according to claim 6 or 7, wherein the error protection means further comprises a first gate circuit (22) which is switched to permit signals to pass through under control of the error protection instruction and is switched to block signals under control of the coincidence instruction.

9. Data processing arrangement according to claim 8, wherein the error protection means comprises a second gate circuit (35, 36) having a gate input connected to the first input of the coincidence circuit and a gate output connected to a data input of the second field, which second gate circuit is switched to permit signals to pass through under control of the error protection instruction and is switched to block signals under control of the coincidence instruction.

10. Data processing arrangement according to claim 9, wherein the coincidence circuit comprises:

(a) a third input for receiving a write or read signal generated by the control circuit,
(b) a third gate circuit (21, 40), having a gate input connected to the third input, which third gate circuit delivers, under control of the error protection instruction, a received write or read signal to its gate output and, under control of the coincidence instruction, delivers the received write or read signal as a read signal to its gate output.

11. The data processing arrangement of claim 10, wherein, the coincidence circuit comprises:

a. a fourth input for receiving a coincidence bit generated by the control unit;
b. a fifth input for receiving a coincidence write command generated by the control unit, which fifth input is connected to a further gate input of the third gate circuit (40);
c. a fourth gate circuit (40) having a first gate input coupled with the fifth input, a second gate input for receiving the coincidence bit from the fourth input, a gate output connected to a further gate input of the second gate circuit, the fourth gate circuit delivering the coincidence bit from its second gate input to its gate output under control of the coincidence write command.

12. Data processing arrangement according to claim 6, wherein the error protection bit generator is a parity bit generator.

13. Data processing arrangement according to claim 6, wherein the coincidence circuit comprises means for blocking the error protection means, the blocking means permitting signals to pass through under control of the error protection instruction and blocking signals under control of the coincidence instruction.

14. Data processing arrangement according to claim 13, wherein the coincidence circuit comprises a fifth gate circuit, (24) having a gate input connected to the second input of the coincidence circuit, which fifth gate circuit is switched to permit signals to pass through under control of the coincidence instruction and is switched to block signals under control of the error protection instruction.

15. Data processing arrangement according to claim 6, wherein the coincidence circuit comprises:

(a) a third input for receiving a write or read signal generated by the control circuit;
(b) a gate circuit (21, 40), having an input connected to the third input, which gate circuit delivers, under control of the error protection instruction, a received write or read signal to its gate output and, under control of the coincidence instruction, delivers the received write or read signal as a read signal to its gate output.

16. Method for writing at least one coincidence bit into a memory device which forms part of a data processing arrangement and which includes a memory suitable both for reading and for writing information, the memory including first and second fields, the first field being for storing data words and the second field being for storing error protection bits corresponding to the data words, so that the error protection bits are co-addressable with the respective data words, the method comprising the following steps:

(a) first generating a coincidence signal which designates at least one accompanying memory address;
(b) first calling up a memory word stored at a first one of the at least one accompanying memory address designated by the coincidence signal;

(c) storing the memory word;
(d) first writing a predetermined memory word in the first field at the first one of the at least one accompanying memory address designated by the coincidence signal;
(e) second generating, from the predetermined memory word, an error protection bit having a value equal to a value of the coincidence bit;
(f) second writing the error protection bit in the second field at the first one of the at least one accompanying memory address designated by the coincidence signal;
(g) third generating a coincidence instruction, indicating that the memory is to operate in a coincidence mode rather than an error protection mode;
(h) second calling up the memory word;
(i) third writing the memory word in the first field at the first one of the at least one accompanying memory address designated by the coincidence signal;
(j) if the coincidence signal contains more than one memory address:
  (A) fourth generating an error protection instruction indicating that the memory is to operate in the error protection mode rather than the coincidence mode;
  (B) repeating steps (b)-(i) for each other memory address;
(k) fourth writing a data bit having a value inverse to that of the coincidence bit at all remaining memory addresses of the second field which have not been designated by the coincidence signal,
whereby later memory accesses to the at least one accomanying address designated by the coincidence signal are monitorable by testing the second field for the value of the coincidence bit.

17. Method for use in a data processing device which includes:
a. a first control unit having
  i. a first output for outputting a memory address,
  ii. a second output for outputting a coincidence control signal, and
  iii. a detection signal input;
b. a memory having
  i. a first input fed by said first output for receiving said memory address,
  ii. a data region for storing data words, the data region having a data output for outputting addressed data words, and
  iii. a read-write parity region for storing in association with each data word a first parity bit co-addressable with its associated data word, said parity region having a bidirectional parity bit connection for outputting the first parity bit co-addressed with the associated data words;
c. a parity bit generator fed by said data output for generating a second parity bit from any received data word;
d. a coincidence control unit, coupled with said parity bit generator, having
  i. a comparator for comparing said second parity bit with the associated first parity bit received from said bidirectional parity bit connection,
  ii. a comparison output,
  iii. a control signal output connected to said detection signal input, and
  iv. a control input coupled with said second output to receive said coincidence control signal; coincidence control unit assuming under control of said coincidence control signal at least first, second, third and fourth states, and
  v. in said first state writing said second parity bit via said bidirectional parity bit connection into said parity region, so that said second parity bit thereafter operates as a first parity bit,
  vi. in said second state reading said first parity bit and connecting said comparison output to said control signal output for signalling any parity error,
  vii. in said third state writing a coincidence control bit with a first value in said parity region on any selected address, said first value differing from a selected value prevailing at any address not selected, and
  viii. in said fourth state interconnecting said bidirectional parity bit connection to said control signal output for signalling, using said first value, addressing of any said selected address; the method comprising the steps of:
e. first generating a coincidence signal with at least one related memory address;
f. second generating an error protection bit from a predetermined memory word, the error protection bit having a value equal to that of the coincidence bit;
g. first writing the error protection bit in the read-write parity region at the at least one memory address designated by the coincidence signal; and
h. second writing a data bit which has a value inverse to the value of the coincidence bit at all remaining addresses of the read-write parity region which have not been designated by the coincidence signal,
whereby later memory accesses to the at least one accompanying address designated by the coincidence signal are monitorable by testing the read-write parity region for the value of the coincidence bit.

18. A memory device for coupling with a data processing arrangement which includes a control unit for generating an error protection instruction, and a coincidence signal, which includes at least one memory address and a coincidence instruction, the memory device comprising:
(a) a memory including:
  (i) a first field for storing data words, and
  (ii) a second field such that for each memory word in the first field at least one error protection bit can be stored at a corresponding address in the second field;
(b) an error protection bit generator, connected to the first field, for generating at least one error protection bit from a memory word;
(c) error protection means for carrying out, together with the error protection bit generator and the second field, an error protection operation on a memory word, which error protection means includes:
  (i) a coincidence circuit having:
    (A) a first input connected to an output of the error protection bit generator,
    (B) a second input connected to a data output of the second field,
    (C) a control input for receiving one of the error protection instruction and the coincidence instruction, and
    (D) a result output for supplying a result of the error protection operation, under the control of the error protection instruction, during reading a memory word,
the coincidence circuit: blocking, under control of the coincidence instruction when the memory is being addressed, the error protection means and an output of the error protection bit generator; reading data from an appropriate address in the second field; recognizing a received coincidence bit from data received at the second input; and providing the received coincidence coincidence bit at the result output; and (d) storage control facilities for storing, under the control of the coincidence signal, a coincidence bit at appropriate memory addresses in the second field.

* * * * *